US009323817B2

(12) United States Patent
Das (10) Patent No.: US 9,323,817 B2
(45) Date of Patent: Apr. 26, 2016

(54) DISTRIBUTED STORAGE SYSTEM WITH PLUGGABLE QUERY PROCESSING

(71) Applicant: LinkedIn Corporation, Mountain View, CA (US)

(72) Inventor: Shirshanka Das, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 374 days.

(21) Appl. No.: 14/041,728

(22) Filed: Sep. 30, 2013

(65) Prior Publication Data

US 2015/0074143 A1    Mar. 12, 2015

Related U.S. Application Data

(60) Provisional application No. 61/875,372, filed on Sep. 9, 2013.

(51) Int. Cl.
*G06F 7/00* (2006.01)
*G06F 17/30* (2006.01)

(52) U.S. Cl.
CPC .... *G06F 17/30566* (2013.01); *G06F 17/30194* (2013.01); *G06F 17/30545* (2013.01)

(58) Field of Classification Search
CPC ................................. G06F 17/30194
See application file for complete search history.

*Primary Examiner* — Ajith Jacob
(74) *Attorney, Agent, or Firm* — Park, Vaughan, Fleming & Dowler LLP; Steven E. Stupp (57) ABSTRACT

As part of a query-processing technique, in response to receiving queries for information stored in a distributed storage system and associated query-processing information identifying sets of predefined operations to perform on one or more databases in the distributed storage system, the distributed storage system accesses sets of predefined operations. Then, for the sets of predefined operations on the one or more databases, the distributed storage system uses one or more adaptors for multiple storage subsystems in the distributed storage system and one or more indexes corresponding to collections of information in the one or more databases. Moreover, the distributed storage system executes the sets of predefined operations on the multiple storage subsystems to obtain results for the queries. The sets of predefined operations may be defined by different users, so that the distributed storage system can be adapted to these users' needs.

20 Claims, 6 Drawing Sheets

DISTRIBUTED STORAGE SYSTEM WITH PLUGGABLE QUERY PROCESSING

CROSS-REFERENCE TO RELATED APPLICATION

This application claims priority to U.S. Provisional Patent Application No. 61/875,372, filed Sep. 9, 2013, which is incorporated herein by reference.

BACKGROUND

1. Field

The described embodiments relate to techniques for providing results in response to queries. More specifically, the described embodiments relate to techniques for providing the results by performing sets of predefined query-processing operations on storage subsystems in a distributed storage system.

2. Related Art

Data in data storage systems is often organized using databases, which may facilitate retrieval of the data in response to one or more requests or queries. In order to optimize the response to a particular query, one or more indexes may be used in the data storage system. These indexes may be data structures that include pointers to address fields or records in the database that are associated with the query, thereby facilitating an accelerated response to the query.

However, the capabilities of existing databases are often limited. In particular, it can be difficult for a database to support (with indexes and sets of query-processing operations) all the capabilities that multiple different applications need. For example, the databases may not be able to encapsulate the business logic or rules for these capabilities without excessive complexity or expense. Consequently, a particular application may provide requests or queries that the database is not configured to support or for which the database is not optimized, or may not be able to submit those requests or queries in a native or preferred format. This conflict between the database and the applications that access the database may negatively affect the applications' performance and/or users' experiences.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for providing a result for a first query and a second query to one or more databases, and a computer-program product (e.g., software) for use with the computer system are described. During this query-processing technique, a distributed storage system comprising one or more databases receives queries for information stored in the system, as well as associated query-processing information identifying sets of predefined operations to perform on the one or more databases.

Based on the sets of predefined operations, the distributed storage system uses one or more adaptors for multiple individual storage subsystems within the distributed storage system, and one or more indexes corresponding to collections of information in the one or more databases. Then, the distributed storage system executes the sets of predefined operations on the multiple storage subsystems to obtain results for the queries. Note that the sets of predefined operations may be defined by different users, so that the distributed storage system can be adapted to these users' needs.

In this way, the query-processing technique may allow the users to predefine the sets of operations so that the distributed storage system can flexibly meet the requirements of different applications. Thus, using this technique, the distributed storage system may provide pluggable query processing. This capability may ensure that the distributed storage system is configured to support a wide variety of user needs without requiring that such a diverse set of business logic or rules be encapsulated in the one or more databases, which may improve user satisfaction and the overall user experience when using the distributed storage system.

In the discussion that follows, an individual, a user or a recipient of the content may include a person (for example, an existing customer, a new customer, a student, an employer, a supplier, a service provider, a vendor, a contractor, etc.). More generally, the query-processing technique may be used by an organization, a business and/or a government agency. Furthermore, a 'business' should be understood to include for-profit corporations, non-profit corporations, groups (or cohorts) of individuals, sole proprietorships, government agencies, partnerships, etc.

Figure 1:
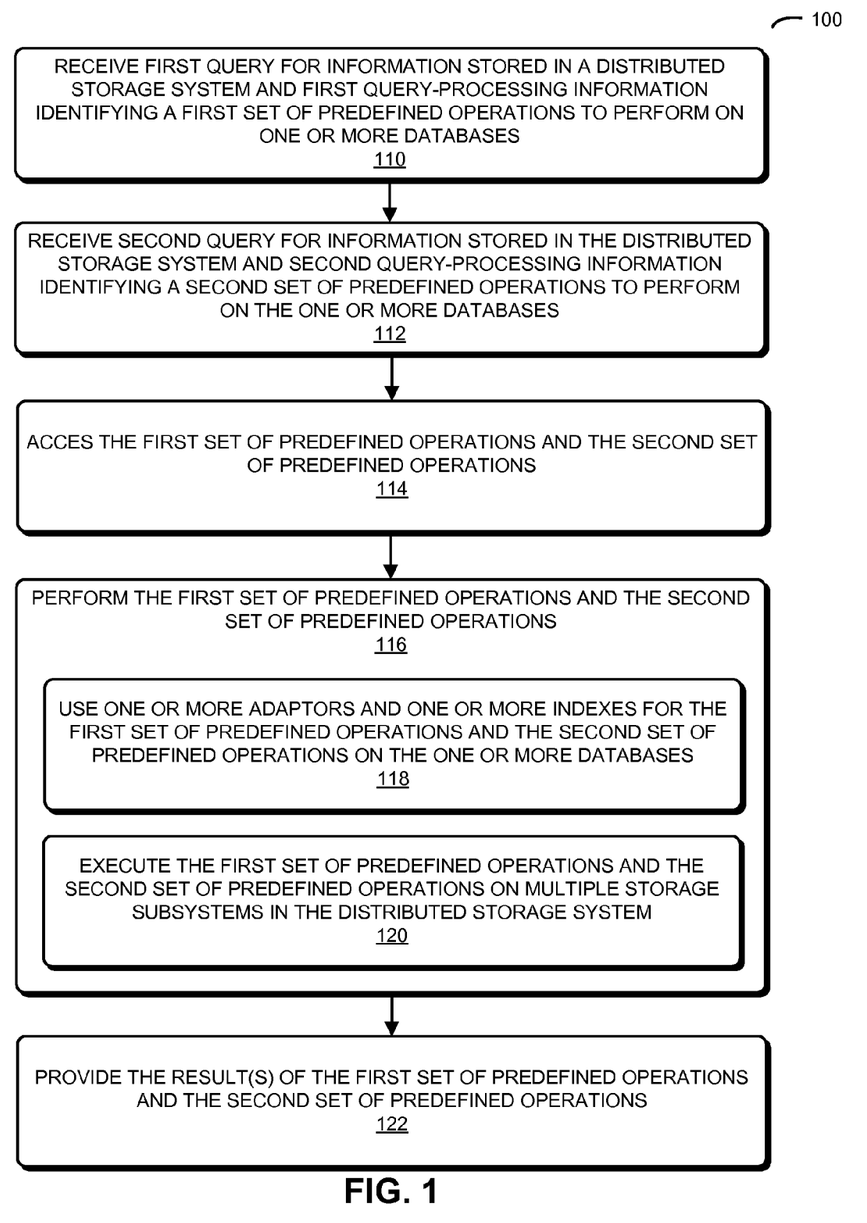
FIG. 1 is a flow chart illustrating a method for providing a result for a first query and a second query to one or more databases in accordance with an embodiment of the present disclosure.

We now describe embodiments of the method. FIG. 1 presents a flow chart illustrating a method 100 for providing a result for a first query and a second query to one or more databases, which may be performed by a computer system (such as computer system 500 in FIG. 5).

During operation, the computer system receives, at a distributed storage system, the first query for information stored in the distributed storage system and first query-processing information identifying a first set of predefined operations to perform on the one or more databases of the distributed storage system (operation 110), and the second query for information stored in the distributed storage system and second query-processing information identifying a second set of predefined operations to perform on the one or more databases (operation 112). The first set of predefined operations and the second set of predefined operations may provide user-defined functionality other than that supported by the structure of the one or more databases. In general, the first set of predefined operations and the second set of predefined operations may be provided by different users.

Note that the distributed storage system may include the one or more databases; adaptors for multiple storage subsystems in the distributed storage system that store the one or more databases; and multiple indexes, where each of the indexes corresponds to a different collection of information stored in the one or more databases. Moreover, the adaptors, the indexes, the first set of predefined operations and the second set of predefined operations may provide dynamic configurability for the distributed storage system.

Figure 4:
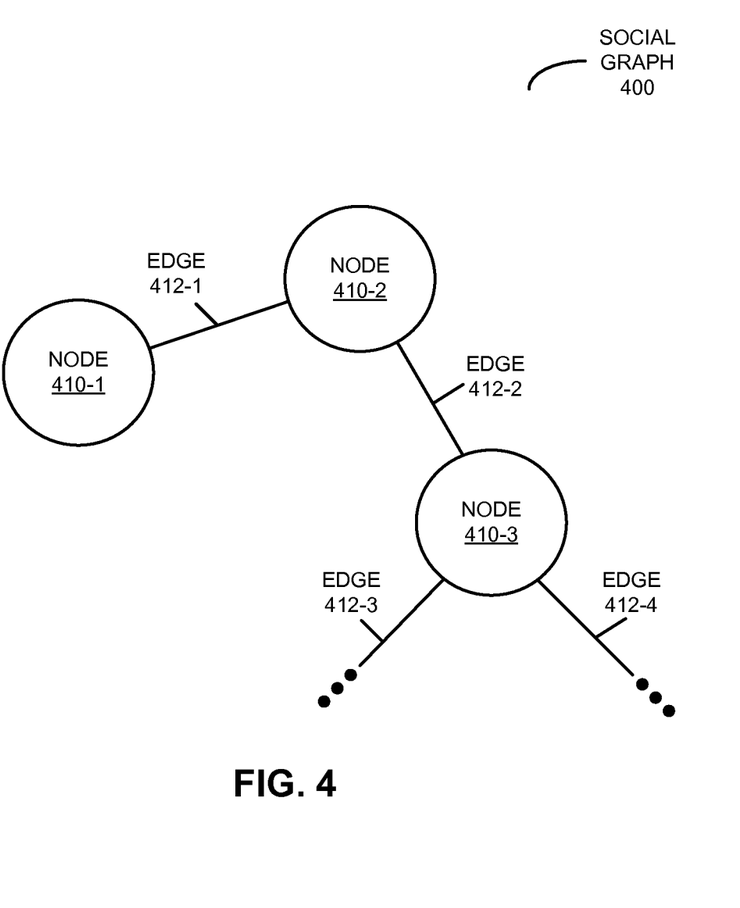
FIG. 4 is a drawing illustrating a social graph in accordance with an embodiment of the present disclosure.

Furthermore, as described further below with reference to FIG. 4, data in the one or more databases may be associated with a software application, such as a software application that implements a social network. When using the software application, users may interact with each other, and may specify professional attributes of multiple individuals and their interconnections with one another as specified by a social graph.

In response to receiving the first query-processing information and the second query-processing information, the computer system accesses the first set of predefined operations and the second set of predefined operations (operation 114). Then, the computer system performs the first set of predefined operations and the second set of predefined operations on the one or more databases (operation 116) by using one or more of the adaptors and one or more of the indexes for the first set of predefined operations on the one or more databases, and the second set of predefined operations on the one or more databases (operation 118), and by executing the first set of predefined operations and the second set of predefined operations on the multiple individual storage subsystems in the distributed storage system (operation 120).

Next, the computer system provides the results of the first set of predefined operations and the second set of predefined operations (operation 122).

In some embodiments, the one or more databases include different types of databases from different providers having different schemas. In these embodiments, performing the first set of predefined operations and the second set of predefined operations in operations 116-120 involves translating the first set of predefined operations and the second set of predefined operations according to the different schemas associated with the different types of databases.

Additionally, in some embodiments the indexes include a first index coupled to a second index. The first index may be updated continuously as data in the one or more databases changes, and the second index may be updated based on the first index after a time interval. In particular, the first index offers a real-time view of a subset of the data. After some time (e.g., hours), the data are indexed in the second index to provide a long-term view. Thus, the first index may be configured to index a relatively small collection of recently accessed data, until the data are captured in the second index.

Figure 2:
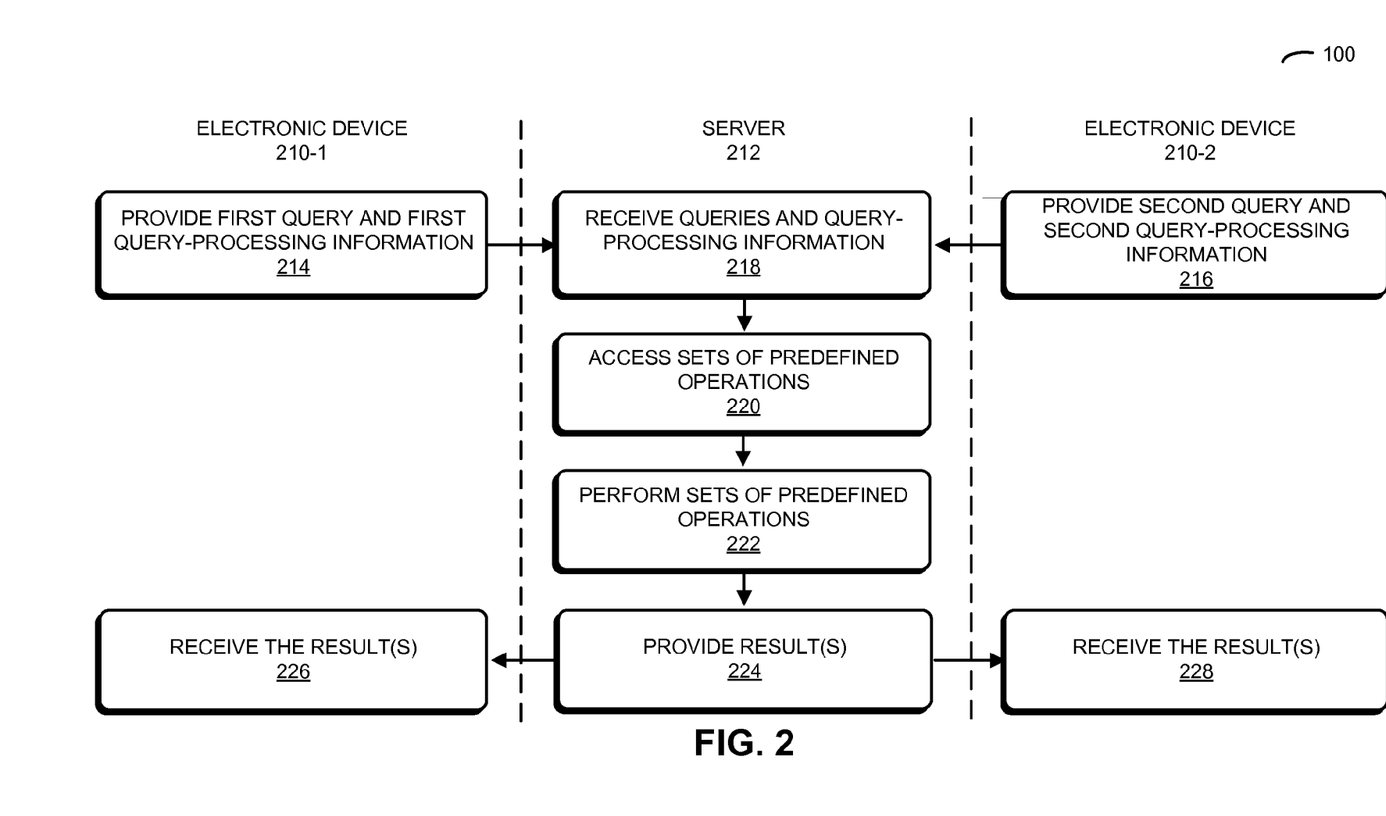
FIG. 2 is a flow chart further illustrating the method of FIG. 1 in accordance with an embodiment of the present disclosure.

In an exemplary embodiment, the query-processing technique is implemented using an electronic device (such as a computer, a cellular telephone and/or a portable electronic device) and at least one server, which communicate through a network, such as a cellular-telephone network and/or the Internet (e.g., using a client-server architecture). This is illustrated in FIG. 2, which presents a flow chart illustrating method 100 (FIG. 1). During this method, a user of electronic device 210-1 and a user of electronic device 210-2 provide (operations 214 and 216) and server 212 receives (operation 218) the first query and the first query-processing information, and the second query and the second query-processing information. For example, these queries and query-processing information may be associated with data generated by a software application that is used by these users.

In response to receiving the first query-processing information and the second query-processing information, server 212 accesses the sets of predefined operations (operation 220). Then, server 212 performs the sets of predefined operations (operation 222) on the one or more databases. Operation 222 includes using one or more of the adaptors and one or more of the indexes for the first set of predefined operations on the one or more databases and the second set of predefined operations on the one or more databases, and executing the first set of predefined operations and the second set of predefined operations on the multiple individual storage subsystems within the distributed storage system.

Next, server 212 provides (operation 224), and electronic devices 210 receive (operations 226 and 228) the requested result(s) of the sets of predefined operations.

In some embodiments of method 100 (FIGS. 1 and 2), there may be additional or fewer operations. Moreover, the order of the operations may be changed, and/or two or more operations may be combined into a single operation.

Figure 3:
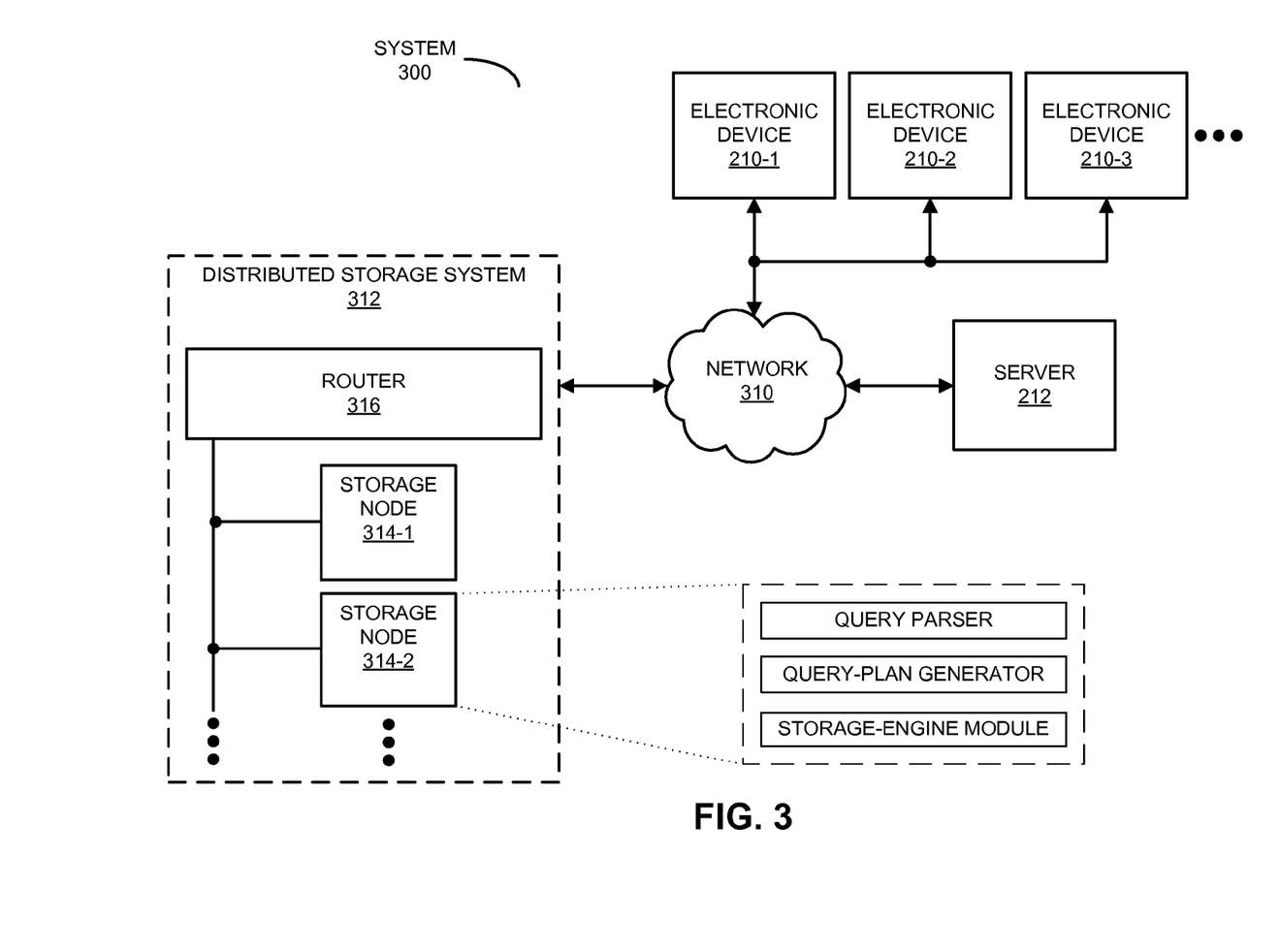
FIG. 3 is a block diagram illustrating a system that performs the method of FIGS. 1 and 2 in accordance with an embodiment of the present disclosure.

We now describe embodiments of the system and the computer system, and their use. FIG. 3 presents a block diagram illustrating a system 300 that performs method 100 (FIGS. 1 and 2). In this system, a user of electronic device 210-1 may use a software product, such as a software application that is resident on and that executes on electronic device 210-1.

Alternatively, the user may interact with a web page that is provided by server 212 via network 310, and which is rendered by a web browser on electronic device 210-1. For example, at least a portion of the software application may be an application tool that is embedded in the web page, and which executes in a virtual environment of the web browser. Thus, the application tool may be provided to the user via a client-server architecture.

The software application operated by the user may be a standalone application or a portion of another application that is resident on and which executes on electronic device 210-1 (such as a software application that is provided by server 212 or that is installed and which executes on electronic device 210-1).

As discussed previously, the user of electronic device 210-1 may use an instance of the software application, which may allow the user to interact with users of other electronic devices 210 in the social network. Data associated with the software application may be provided by electronic devices 210 to server 212 via network 310.

Server 212 may store this data and may retrieve information (for example, in response to queries from the software application) in a distributed storage system 312. This distributed storage system may include multiple storage subsystems (such as storage nodes 314). Data, queries and results may be routed to and from storage nodes 314 by router 316.

Each of storage nodes 314 may include a server and one or more databases. Moreover, each of storage nodes 314 may include a query parser, a query plan generator, and a storage-engine module. In an exemplary embodiment, these modules may be implemented in software. For example, the query plan generator may be a Java process (from Oracle Corporation of Redwood Shores, Calif.) that executes in a compatible computing environment, such as a Linux operating system. However, in other embodiments the query parser, the query plan generator, and the storage engine are implemented, at least in part, in hardware.

As described further below, the storage-engine module may interface to multiple different types of databases from different providers in storage nodes 314. In general, these databases may be located local to the distributed storage system 312 or remote from distributed storage system 312.

It is preferable if the technology in distributed storage system 312 can be swapped in and out for persistence, redundancy, and availability without having to rewrite the software modules in storage nodes 314. To facilitate this capability, storage nodes 314 may have pluggable storage adaptors, indexes and query processing. This pluggable capability of distributed storage system 312 may allow it to be an open system that facilitates external innovation and the use of different storage subsystems or building blocks. For example, distributed storage system 312 can accommodate adaptors from multiple different workloads, queries and physical characteristics of the storage subsystems.

Note that the adaptors may facilitate interaction across heterogeneous databases, i.e., the multiple different types of databases from the different providers (such as MySQL and/or an Oracle database), and, more generally, for different underlying storage subsystems in distributed storage system 312. As noted previously, distributed storage system 312 may implement heterogeneous storage across the different databases. To do so, distributed storage system 312 may include handlers and translation tools for the different schemas associated with the different types of databases.

Moreover, the indexes may optimize the performance of queries for different collections of information in the one or more databases. For example, the indexes may include pointers to rows (like address fields) in the one or more databases. In general, the indexing structures may be optimized for certain write and read operations (such as querying data in a particular time range). However, it can be difficult to update these indexes in real-time. To address this challenge, there may be two kinds of indexes. There may be a real-time index that is updated in real-time as transactions occur on the one or more databases. Then, after a time interval (such as 1 hour), a near-time index may be updated based on the real-time data. This approach may provide good performance for batch data transactions. These cascaded indexes may provide an organized buffer that can be queried.

Furthermore, because the one or more databases may not encompass all the business logic or rules needed for all the capabilities of the software application, users may generate sets of predefined operations for query-processing logic. These query-processing plug-ins may allow the users to customize the capabilities of the one or more databases without expensive and time-consuming modifications to the one or more databases.

For example, company B may have web pages or landing pages that are associated with the software application. These web pages may allow the users of the software application to follow company developments, recommend the company, or indicate that they like the company in the context of the social network. The web pages may also allow the users of the software application to recommend the company's products, to indicate that they like the company's products, or to write reviews about the company's products.

Company B may want to leverage the user profiles in the social graph associated with the social network (which is described further below with reference to FIG. 4). For example, a user A may be connected to 100 people in the social graph. If three of these people like or recommend one of company B's products, then company B's products may be placed higher in the ranking of results to a query from user A for product information. In this way, the most relevant products may be presented to user A.

However, this is a complicated query that is typically difficult to implement in the one or more databases. In particular, there may be 1000 products that need to be ranked and sorted so the top-N results can be presented. In general, there may be too many of these types of application to implement in the database architecture and the associated indexes without undue complexity and cost.

Instead, company B or a team at a provider of the software application may generate a set of predefined operations to perform this query, and may provide the set of predefined operations (or a pointer to the set of predefined operations) to distributed storage system 312. The set of predefined operations may, for example, look-up user A's network in the social graph, determine the intersection of company B's products with the individuals in user A's network, and rank company B's products accordingly. In this way, the one or more databases may be externally customized (i.e., without modifying the one or more databases) to the needs of company B.

Illustratively, the predefined operations may be stored in the one or more databases or, more generally, within the distributed storage system (e.g., within storage nodes 314 of system 312 of FIG. 3). However, they may be stored external to the distributed storage system. For example, a query received at the storage system may include part or all of a predefined operation. Thus, a query may include a one-time operation not already stored at the storage system, or one or more terms for completing or modifying an existing predefined operation.

Note that information in system 300 may be stored at one or more locations in system 300 (i.e., locally and/or remotely). Moreover, because this data may be sensitive in nature, it may be encrypted. For example, stored data and/or data communicated via network 310 may be encrypted.

We now further describe the social graph. As noted previously, the users, their attributes, associated organizations (or entities) and/or their interrelationships (or connections) may specify a social graph. FIG. 4 is a drawing illustrating a social graph 400. This social graph may represent the connections or interrelationships among nodes 410 (corresponding to users, attributes of the users, entities, etc.) using edges 412. In the context of the query-processing technique, social graph 400 may specify business information, and edges 412 may indicate interrelationships or connections between the users and organizations. However, in some embodiments, nodes 410 may be associated with attributes (such as skills) and business information (such as contact information) of the users and/or organizations.

In general, 'entity' should be understood to be a general term that encompasses an individual, an attribute associated with one or more individuals (such as a type of skill), a company where the individual worked or an organization that includes (or included) the individual (e.g., a company, an educational institution, the government, the military), a school that the individual attended, a job title, etc. Collectively, the information in social graph 400 may specify profiles (such as business or personal profiles) of individuals.

Figure 5:
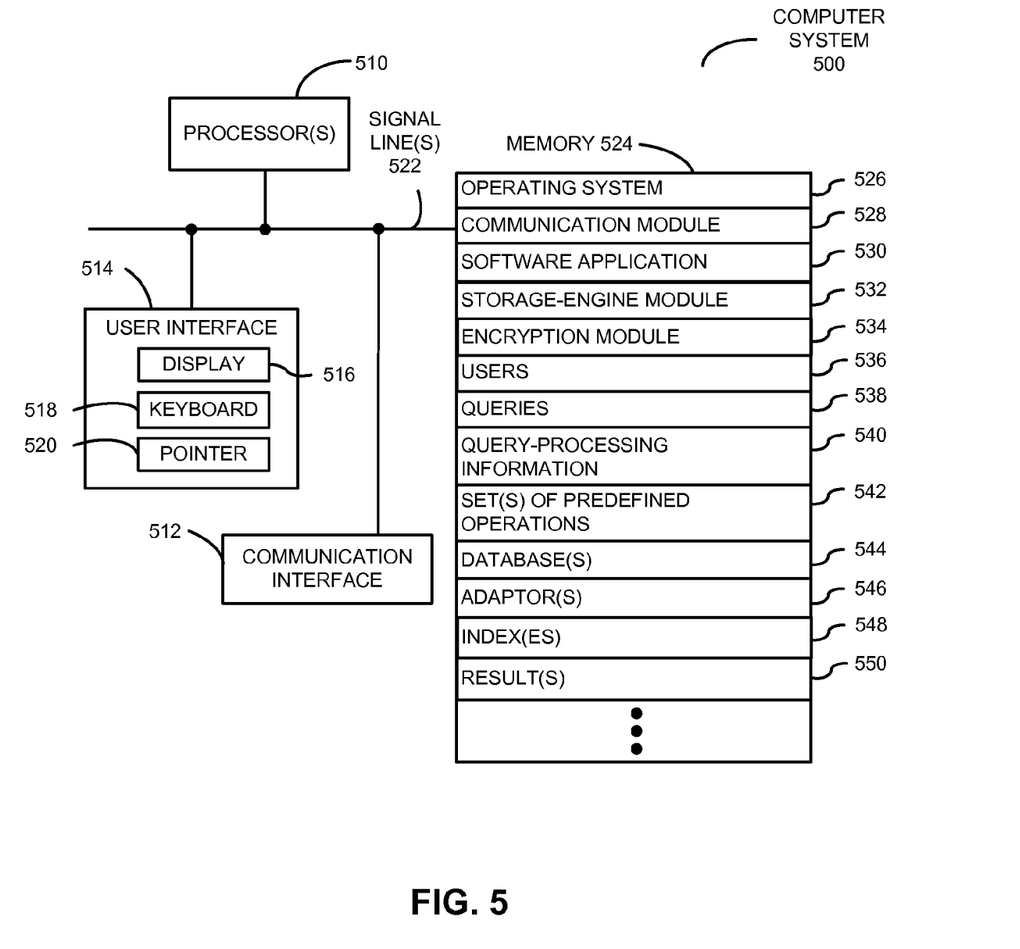
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include a display 516 (such as a touchscreen), a keyboard 518, and/or a pointer 520, such as a mouse.

Memory 524 in computer system 500 may include volatile memory and/or non-volatile memory. More specifically, memory 524 may include ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including software application 530 (or a set of instructions), storage-engine module 532 (or a set of instructions), and/or encryption module 534 (or a set of instructions). Note that one or more of these program modules (or sets of instructions) may constitute a computer-program mechanism.

During operation of computer system 500, users 536 may use software application 530 (such as a software application that implements a social network). For example, users 536 may communicate messages to each other (such as invitations to establish connections in the social graph). During these sessions, instances of software application 530 on electronic devices of users 536 may provide queries 538 and query-processing information 540, which are received via communication interface 512 and communication module 528.

Figure 6:
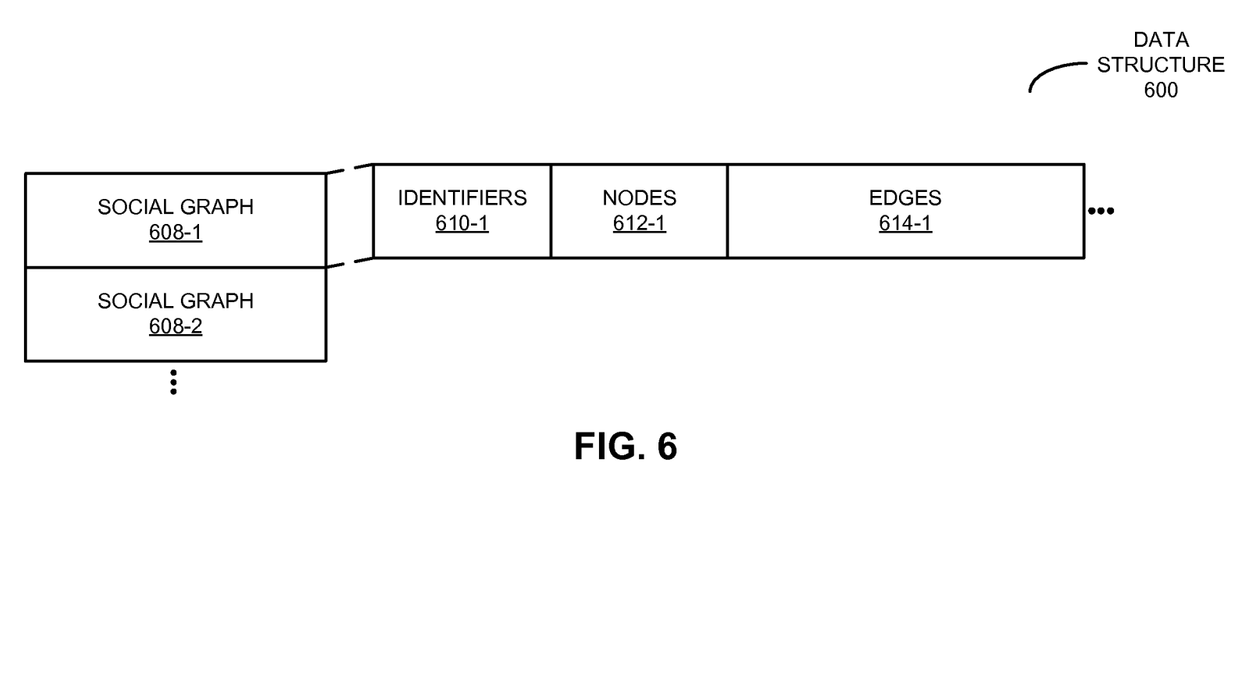
FIG. 6 is a block diagram illustrating a data structure for use in the computer system of FIG. 5 in accordance with an embodiment of the present disclosure.

In response to receiving query-processing information 540, storage-engine module 532 accesses sets of predefined operations 542 identified by query-processing information 540. These sets of predefined operations 542 may be user-defined and may have previously been provided by users 536 to computer system 500. Then storage-engine module 532 performs the sets of predefined operations 542 on one or more databases 544, which may include data associated with software application 530, such as information specifying the social graph. FIG. 6 presents a block diagram illustrating a data structure 600 in the one or more databases 544 (FIG. 5). In particular, data structure 600 may include one or more social graphs 608 for use in computer system 500 (FIG. 5). For example, social graph 608-1 may include identifiers 610-1 for the individuals, nodes 612-1, and/or edges 614-1 that represent relationships or connections between nodes 612-1. For example, nodes 612-1 may include or may be associated with skills, jobs, companies, schools, locations, etc. of the individuals.

Referring back to FIG. 5, performing the sets of predefined operations 542 may involve using one or more of adaptors 546 and one or more indexes 548 for the sets of predefined operations 542 on one or more databases 544, and executing the sets of predefined operations 542 on the multiple storage subsystems in the distributed storage system.

Next, computer system 500 provides one or more result(s) 550 of the sets of predefined operations 540 to the electronic devices of users 536 via communication interface 512 and communication module 528.

Because information in computer system 500 may be sensitive in nature, in some embodiments at least some of the data stored in memory 524 and/or at least some of the data communicated using communication module 528 is encrypted using encryption module 534.

Instructions in the various modules in memory 524 may be implemented in a high-level procedural language, an object-oriented programming language, and/or in an assembly or machine language. Note that the programming language may be compiled or interpreted, e.g., configurable or configured, to be executed by the one or more processors.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over multiple servers or computers, with various groups of the servers or computers performing particular subsets of the functions. In some embodiments, some or all of the functionality of computer system 500 is implemented in one or more application-specific integrated circuits (ASICs) and/or one or more digital signal processors (DSPs).

Computer systems (such as computer system 500), as well as electronic devices, computers and servers in system 300 (FIG. 3) may include one of a variety of devices capable of manipulating computer-readable data or communicating such data between two or more computing systems over a network, including a personal computer, a laptop computer, a tablet computer, a mainframe computer, a portable electronic device (such as a cellular phone or PDA), a server and/or a client computer (in a client-server architecture). Moreover, network 310 (FIG. 3) may include the Internet, World Wide Web (WWW), an intranet, a cellular-telephone network, LAN, WAN, MAN, or a combination of networks, or other technology enabling communication between computing systems.

System 300 (FIG. 3), computer system 500 and/or data structure 600 (FIG. 6) may include fewer components or additional components. Moreover, two or more components may be combined into a single component, and/or a position of one or more components may be changed. In some embodiments, the functionality of system 300 (FIG. 3) and/or computer system 500 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for providing a result for a first query and a second query to one or more databases, the method comprising:
receiving, at a distributed storage system:
the first query for information stored in the distributed storage system and first query-processing information identifying a first set of predefined operations to perform on the one or more databases; and the second query for information stored in the distributed storage system and second query-processing information identifying a second set of predefined operations to perform on the one or more databases;

wherein the distributed storage system comprises:
the one or more databases;
adaptors for multiple storage subsystems in the distributed storage system that store the one or more databases; and
multiple indexes, wherein each of the indexes corresponds to a different collection of information stored in the one or more databases;

in response to receiving the first query-processing information and the second query-processing information, accessing the first set of predefined operations and the second set of predefined operations;

using the computer system, performing the first set of predefined operations and the second set of predefined operations on the one or more databases by:
using one or more of the adaptors and one or more of the indexes for the first set of predefined operations on the one or more databases and the second set of predefined operations on the one or more databases; and
executing the first set of predefined operations and the second set of predefined operations on the multiple storage subsystems in the distributed storage system; and providing the result of the first set of predefined operations and the second set of predefined operations, including the requested result.

2. The method of claim 1, wherein the one or more databases include different types of databases from different providers having different schemas.

3. The method of claim 2, wherein performing the first set of predefined operations and the second set of predefined operations involves translating the first set of predefined operations and the second set of predefined operations to the different schemas associated with the different types of databases.

4. The method of claim 1, wherein the indexes include a first index coupled to a second index;
wherein the first index is updated continuously as data in the one or more databases is changed; and
wherein the second index is updated based on the first index after a time interval.

5. The method of claim 1, wherein the first set of predefined operations and the second set of predefined operations provide user-defined functionality other than that supported by the structure of the one or more databases.

6. The method of claim 1, wherein the adaptors, the indexes, the first set of predefined operations and the second set of predefined operations provide dynamic configurability for the distributed storage system.

7. The method of claim 1, wherein data in the one or more databases includes professional attributes of multiple individuals and their interconnections with one another as specified by a social graph.

8. A computer-program product for use in conjunction with a computer system, the computer-program product comprising a non-transitory computer-readable storage medium and a computer-program mechanism embedded therein, to provide a result for a first query and a second query to one or more databases, the computer-program mechanism including:
instructions for receiving, at a distributed storage system:
the first query for information stored in the distributed storage system and first query-processing information identifying a first set of predefined operations to perform on the one or more databases; and
the second query for information stored in the distributed storage system and second query-processing information identifying a second set of predefined operations to perform on the one or more databases;
wherein the distributed storage system comprises:
the one or more databases;
adaptors for multiple storage subsystems in the distributed storage system that store the one or more databases; and
multiple indexes, wherein each of the indexes corresponds to a different collection of information stored in the one or more databases;
instructions for accessing the first set of predefined operations and the second set of predefined operations in response to receiving the first query-processing information and the second query-processing information;
instructions for performing the first set of predefined operations and the second set of predefined operations on the one or more databases by:
using one or more of the adaptors and one or more of the indexes for the first set of predefined operations on the one or more databases and the second set of predefined operations on the one or more databases; and
executing the first set of predefined operations and the second set of predefined operations on the multiple storage subsystems in the distributed storage system; and
instructions for providing the result of the first set of predefined operations and the second set of predefined operations, including the requested result.

9. The computer-program product of claim 8, wherein the one or more databases include different types of databases from different providers having different schemas.

10. The computer-program product of claim 9, wherein performing the first set of predefined operations and the second set of predefined operations involves translating the first set of predefined operations and the second set of predefined operations to the different schemas associated with the different types of databases.

11. The computer-program product of claim 8, wherein the indexes include a first index coupled to a second index;
wherein the first index is updated continuously as data in the one or more databases is changed; and
wherein the second index is updated based on the first index after a time interval.

12. The computer-program product of claim 8, wherein the first set of predefined operations and the second set of predefined operations provide user-defined functionality other than that supported by the structure of the one or more databases.

13. The computer-program product of claim 8, wherein the adaptors, the indexes, the first set of predefined operations and the second set of predefined operations provide dynamic configurability for the distributed storage system.

14. The computer-program product of claim 8, wherein data in the one or more databases includes professional attributes of multiple individuals and their interconnections with one another as specified by a social graph.

15. A computer system, comprising: a distributed storage system that includes multiple storage nodes, wherein a given storage node includes:
a processor;
memory; and a storage-engine program module, wherein the storage-engine program module is stored in the memory and configured to be executed by the processor to provide a result for a first query and a second query to one or more databases, the storage-engine program module including:
  instructions for receiving, at the distributed storage system:
    the first query for information stored in the distributed storage system and first query-processing information identifying a first set of predefined operations to perform on the one or more databases; and
    the second query for information stored in the distributed storage system and second query-processing information identifying a second set of predefined operations to perform on the one or more databases;
    wherein the distributed storage system comprises:
      the one or more databases;
      adaptors for multiple storage subsystems in the distributed storage system that store the one or more databases; and
      multiple indexes, wherein each of the indexes corresponds to a different collection of information stored in the one or more databases;
  instructions for accessing the first set of predefined operations and the second set of predefined operations in response to receiving the first query-processing information and the second query-processing information;
  instructions for performing the first set of predefined operations and the second set of predefined operations on the one or more databases by:
    using one or more of the adaptors and one or more of the indexes for the first set of predefined operations on the one or more databases and the second set of predefined operations on the one or more databases; and
    executing the first set of predefined operations and the second set of predefined operations on the multiple storage subsystems in the distributed storage system; and
  instructions for providing the result of the first set of predefined operations and the second set of predefined operations, including the requested result.

16. The computer system of claim 15, wherein the one or more databases include different types of databases from different providers having different schemas.

17. The computer system of claim 16, wherein performing the first set of predefined operations and the second set of predefined operations involves translating the first set of predefined operations and the second set of predefined operations to the different schemas associated with the different types of databases.

18. The computer system of claim 15, wherein the indexes include a first index coupled to a second index;
  wherein the first index is updated continuously as data in the one or more databases is changed; and
  wherein the second index is updated based on the first index after a time interval.

19. The computer system of claim 15, wherein the first set of predefined operations and the second set of predefined operations provide user-defined functionality other than that supported by the structure of the one or more databases.

20. The computer system of claim 15, wherein data in the one or more databases includes professional attributes of multiple individuals and their interconnections with one another as specified by a social graph.

* * * * *